UNITED STATES PATENT OFFICE.

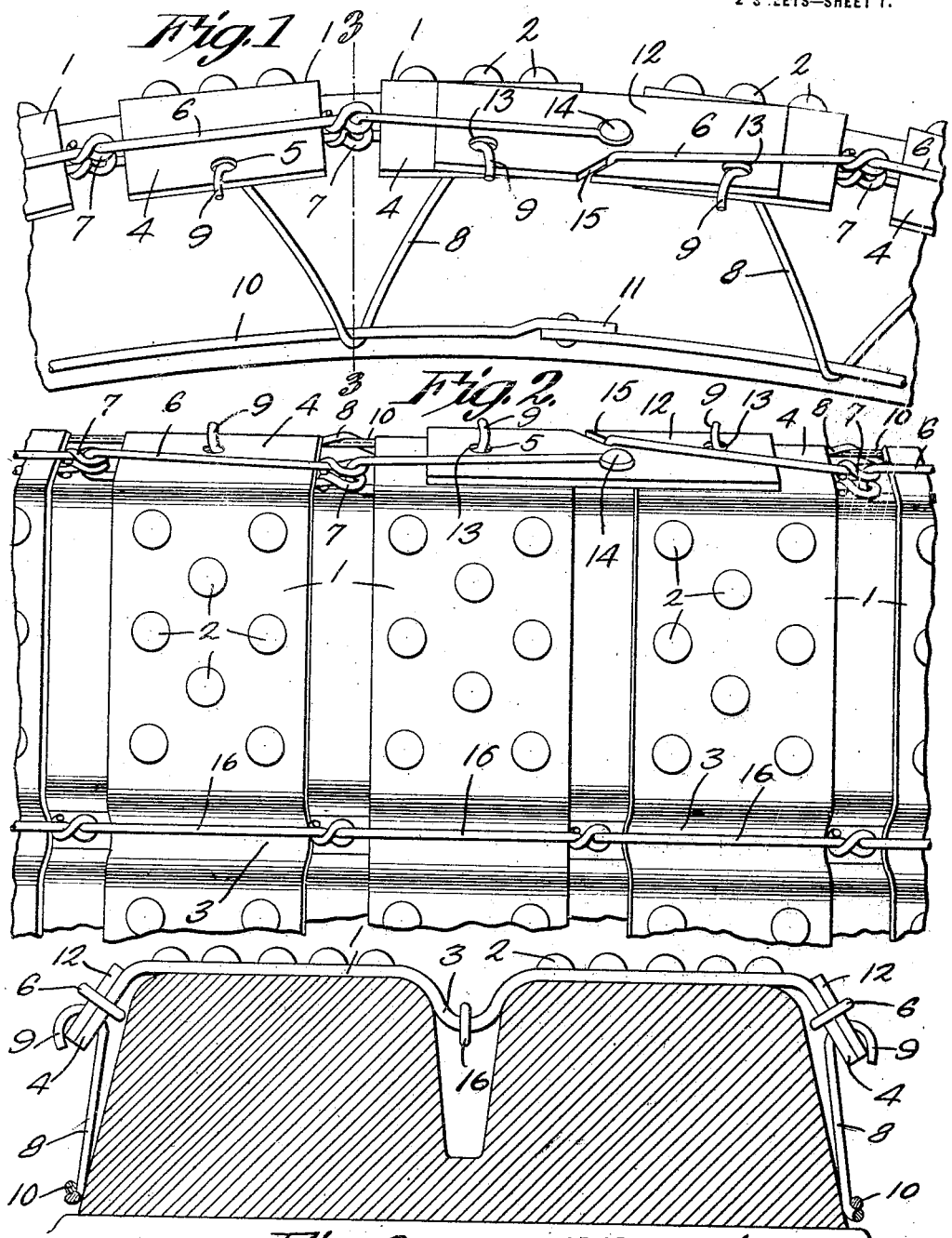

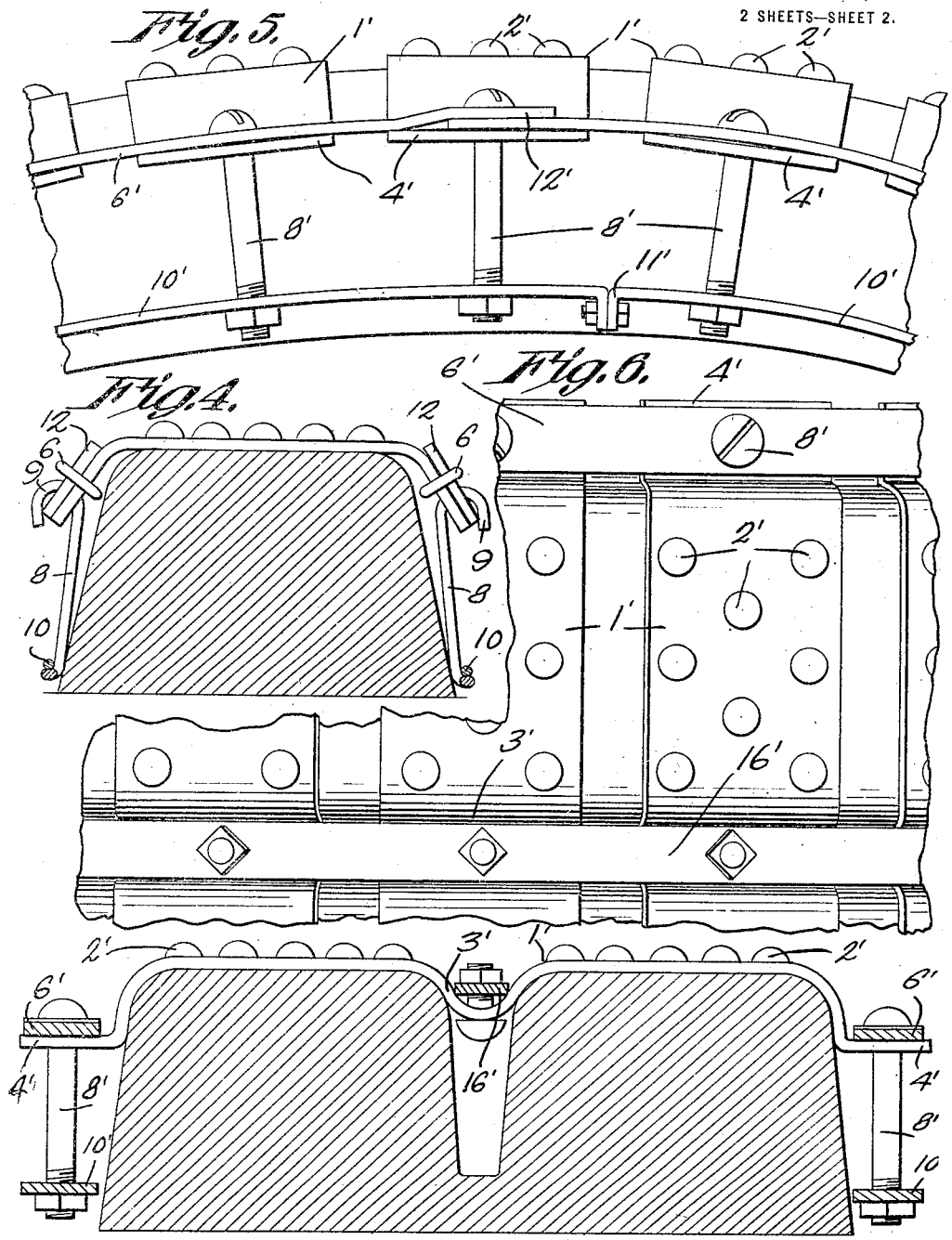

JOHANN DANIEL MELCHIOR, OF SCRANTON, PENNSYLVANIA.

TIRE-ARMOR.

1,251,401.

Specification of Letters Patent.    Patented Dec. 25, 1917.

Application filed January 26, 1917. Serial No. 144,737.

*To all whom it may concern:*

Be it known that I, JOHANN DANIEL MELCHIOR, a citizen of the United States, residing at Scranton, in the county of Lackawanna and State of Pennsylvania, have invented a new and useful Tire-Armor, of which the following is a specification.

The present invention appertains to antiskid devices for use upon tires of automobiles, and other vehicles, and it is the object of the invention to provide a novel and improved tire armor which will effectively prevent skidding or slipping and which will also facilitate traction, without cutting or tearing the road.

It is the object of the invention to provide a tire armor the sections or units of which are assembled in a novel manner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a fragmental side elevation of the armor.

Fig. 2 is a plan view of the portion of the armor illustrated in Fig. 1.

Fig. 3 is a cross section taken on the line 3—3 of Fig. 1.

Fig. 4 is a view similar to Fig. 3 of a modification.

Fig. 5 is a fragmental side elevation of a further modification.

Fig. 6 is a plan view of the parts shown in Fig. 5.

Fig. 7 is a cross section of the structure shown in Fig. 5.

Referring particularly to Figs. 1, 2 and 3, the armor illustrated therein embodies a series of transverse shoes or plates 1 stamped from suitable sheet metal, and adapted to extend transversely across the tread of a tire to protect the same, prevent skidding and facilitate traction, each shoe or plate 1 having rounded studs or calks 2 struck outwardly therefrom to engage the ground and obtain a grip thereon without tearing or cutting the road. The armor illustrated in these figures is for use upon a double tire, as seen in Fig. 3, and in this event, each shoe is provided intermediate its ends with an instruck curved portion 3 disposed between the two parts of the tire to assist in holding the shoes in place. The ends of the shoes are bent inwardly at an obtuse angle, as at 4, and are each provided with an aperture 5.

A doubled wire link 6 is fitted loosely upon each end portion of each shoe, and its ends are provided with loops 7 loosely engaging the bend of the companion link, thereby providing two longitudinal chains extending along the shoes at opposite sides and engaging the ends of the shoes. These links or chains formed thereby serve to link the shoes together.

V-shaped links or members 8 have outturned hooks 9 at their ends engaging outwardly through the apertures 5 of the shoes, and their intermediate or crotch portions straddle annular side wires 10 which are disposed at opposite sides of the tire, said wires or equivalent elements extending through the links 8 and the wires are jointed in any suitable manner, as at 11, whereby they can be opened for removing the armor. The wires or elements 10 serve to hold the shoes snugly upon the tire, and the hooks 9 also serve to hold the links 6 upon the shoes.

The ends of the armor and ends of the chains composed of the links 6 are coupled together by means of coupling plates or members 12 overlapping the end portions of the end shoes, as seen in Figs. 1 and 2, the plates 12 having apertures 13 adjacent to their ends through which the respective hooks 9 are also engaged, whereby to couple the respective shoes together. The loops 7 of the respective links 6 are fastened to the intermediate portions of the plates 12 by means of bolts 14 or otherwise, and the inner edges of the plates 12 are provided adjacent to the bolts 14 with oblique slots or notches 15 for the engagement of the bends of the companion links 6, as clearly seen in Fig. 1, thereby also connecting the ends of the side chains which connect the shoes. To detach the ends of the armor, those links 6 which engage the notches 15 can be readily disengaged therefrom, and the plates 12 can be disconnected from one shoe by removing the respective hooks 9 after the wires or elements 10 have been opened or loosened.

If desired, links 16 similar to the links 6 can be provided upon the instruck portions 3 for linking together the intermediate portions of the shoes.

Fig. 4 illustrates a modified form which is designed for use upon a single tire, the shoes being shorter and not having the portions 3 above described.

In the modified form illustrated in Figs. 5, 6 and 7, the shoes 1' have the outstruck studs or calks 2' and the instruck curved portions 3', similar to the shoes above described, and the ends of the shoes are bent or offset inwardly, as at 4'. Bands or straps 6' pass across the offset ends 4', and radial bolts 8' extend through the bands 6' and ends 4' and have their inner ends engaged through bands or straps 10' within and concentric with the outer bands 6'. The bolts 8' serve to fasten the bands 6' and shoes together and also connect them with the inner bands 10' to hold the armor on the tire, said bolts serving as links for connecting the shoes and outer bands with the inner bands. The inner bands have their ends jointed as at 11', for contracting the inner bands and holding the shoes snugly against the tire, and the ends of the outer bands are preferably overlapped under the heads of certain bolts 8' as at 12'. An intermediate band 16' can be bolted within the portions 3', if desired.

Having thus described the invention, what is claimed as new is:—

1. A tire armor embodying a series of transverse shoes, members extending along the ends of the shoes, links engaged with the shoes and holding said members assembled therewith, and means engaging said links for holding the shoes upon a tire.

2. A tire armor embodying a series of transverse shoes, members extending along the ends of the shoes for connecting them, and means for holding the shoes on a tire engaging the shoes and also serving to hold said members assembled with the shoes.

3. A tire armor embodying a series of shoes, links slipped onto said shoes and engaging each other for connecting the shoes, and means engaged with the shoes for also holding them upon a tire and holding the links upon the shoes.

4. A tire armor embodying a series of transverse shoes, chains having their links slipped upon the ends of the shoes, elements for retaining the shoes upon a tire, and links connecting said elements and ends of the shoes and also holding said chain links upon the shoes.

In testimony that I claim the foregoing as my own, I have hereto affixed my signature in the presence of two witnesses.

JOHANN DANIEL MELCHIOR.

Witnesses:
F. J. HELNEGEL,
T. A. DONAHOE.